United States Patent
Wolf et al.

(10) Patent No.: US 8,354,770 B2
(45) Date of Patent: Jan. 15, 2013

(54) ALTERNATOR FOR MOTOR VEHICLES

(75) Inventors: Gert Wolf, Affalterbach (DE);
Alexander Shendi, Asperg (DE); Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/304,098

(22) PCT Filed: Jun. 4, 2007

(86) PCT No.: PCT/EP2007/055453
§ 371 (c)(1),
(2), (4) Date: Nov. 13, 2009

(87) PCT Pub. No.: WO2007/141230
PCT Pub. Date: Dec. 13, 2007

(65) Prior Publication Data
US 2010/0156230 A1    Jun. 24, 2010

(30) Foreign Application Priority Data
Jun. 7, 2006  (DE) .......................... 10 2006 026 402

(51) Int. Cl.
*H02K 3/28* (2006.01)
(52) U.S. Cl. ....................................... 310/263; 310/180
(58) Field of Classification Search .................. 310/263, 310/179, 180
See application file for complete search history.

(56) References Cited

U.S. PATENT DOCUMENTS

| | | | |
|---|---|---|---|
| 3,175,142 A | 3/1965 | Rawcliffe | |
| 3,602,747 A * | 8/1971 | Stroppa et al. | 310/68 D |
| 5,654,602 A | 8/1997 | Willyoung | |
| 5,894,182 A * | 4/1999 | Saban et al. | 310/216.048 |
| 7,091,644 B2 * | 8/2006 | Fukushima et al. | 310/179 |
| 2007/0090713 A1 * | 4/2007 | Arita et al. | 310/181 |

FOREIGN PATENT DOCUMENTS

| | | |
|---|---|---|
| CN | 2329114 | 7/1999 |
| CN | 1409460 | 4/2003 |
| DE | 27 30 177 | 1/1979 |
| DE | 195 11 920 | 9/1996 |
| EP | 1 276 212 | 1/2003 |
| EP | 1 381 140 | 1/2004 |
| JP | 55-097166 | 7/1980 |
| JP | 60-131042 | 7/1985 |
| JP | 2000-341890 | 12/2000 |
| RU | 2231890 | 6/2004 |

OTHER PUBLICATIONS

Technical textbook "Ankerwicklungen für Gleich- und Wechselstronunaschinen" [Armature Windings for Direct and Alternating Current Machines], by Rudolf Richter, 1920 edition, (hereinafter "Richter"), pp. 211 and 421 (along with the English translation).
Spooner et al., "Direct coupled, permanent magnet generators for wind turbine applications", IEE Proc. Electr. Power Appl., Jan. 1996, vol. 143, No. 1, pp. 1-8.

* cited by examiner

*Primary Examiner* — Dang Le
(74) *Attorney, Agent, or Firm* — Kenyon & Kenyon LLP

(57) ABSTRACT

An alternator for motor vehicles, having a rotor, whose poles are developed as claw-poles. In order to improve the design options of the stator of the machine, its multiphase winding is developed as a fractional-slot winding, whereby, in particular with respect to the selection of the number of slots, many additional options are created, by which both the production is made clearly simpler and less costly and, at the same time, the electrical properties are able to be improved.

19 Claims, 4 Drawing Sheets

ALTERNATOR FOR MOTOR VEHICLES

FIELD OF THE INVENTION

The present invention relates to an alternator for motor vehicles.

BACKGROUND INFORMATION

The present invention relates to an alternator for motor vehicles, such as is discussed in DE 31 41 153 A1. It has a laminated stator core, originally developed in flat laminated form, having a three-phase stator winding, in which a magnetic field is induced rotating with the rotor by the rotor poles developed as claw-poles. Such generators have windings that have slot numbers that amount to an integral multiple of the pole number and the number of phases, in particular three-phase generators being commonly used that have 12 poles and 3 phases, as well as a slot number of 36. Furthermore, three-phase generators are also known in a 16-pole version as generators for motor vehicles having 48 slots. The number of holes q of this machine, which is given by the slot number N divided by the number of poles 2p and the number of phases m, is a whole number and has the value 1 in the above-mentioned case.

Generators having two or three hole windings are also known. A three-phase two-hole winding having 12 poles has 72 slots, and a three-phase three-hole winding has 108 slots. A three-phase generator in a 16-pole version then has 48 slots for a number of holes of q=1, and 96 slots for a number of holes of q=2.

Besides three-phase generators, 6-phase machines are also known for motor vehicles that have a number of holes of q=1 which, in the case of a 12-pole version then have 72 slots, and in the case of a 16-pole version of the machine, having a number of holes of q=1, 96 slots come about.

It is easy to see, from the previously named examples of motor vehicle generators currently in the market, that the selection of the possible slot numbers is small and that the slot number very rapidly assumes high values, whereby very narrow teeth that are difficult to stamp and small slot cross sections come about for the stator, which makes winding the stator more difficult, and gives rise to a poor fullness factor.

Furthermore, fractional slot windings are discussed in principle from the textbook, "Elektrische Maschinen (Electrical Machines)" by Bödefeld and Sequenz, Springer-Verlag Wien, 1962, pp 126 ff. However, these are used in practice only for large machines, as is also shown in the exemplary embodiments of the textbook, on p. 128. They have a number of holes q as the quotient of the slot number N, divided by the pole number 2p and the number of phases m, which is not a whole number but a fraction. In the construction of large-scale machines, fractional-slot windings are known particularly for large synchronous generators, in which windings are used that have a number of holes q=2.5 or 3.5.

SUMMARY OF THE INVENTION

By contrast, the design according to the exemplary embodiments and/or exemplary methods of the present invention of the stator of an alternator for motor vehicles has the advantage, compared to the related art, that the previously named restrictions in the selection of the slot numbers of the stator, and the mechanical and electrical disadvantages caused thereby in the design and manufacturing of the winding are at least clearly reduced. In particular, in machines having higher phases, the design of the stator is supposed to be improved to the extent that favorable stamping shapes for the stator sheet metals come about, as well as a winding technique that is as simple as possible and a good slot fullness. This is achieved by the execution of the stator winding as a fractional-slot winding, particularly pole numbers between 10 and 20, which may be pole numbers of 12 or 16 making possible an especially advantageous construction of the machines from a standpoint of production engineering. Small pole numbers having few claws require large forming forces for the claw poles and make their design more difficult, while too great a number of poles having small distances between the different-pole claws causes greater magnetic losses.

With respect to the slot number of the stator winding, it is expedient if this is selected to be greater than 1.5 times the pole number, which may be greater than twice the pole number. By doing this in the case of suitable limitation of the number of holes q of the winding in 10 to 20-pole machines, slot numbers between 15 and 150 come about, which may be between 40 and 100. The upper boundary is determined by the production engineering difficulties in stamping filigree slot and pole geometries, as well as by the problems in applying the coils in very tight slots. The lower boundary for suitable slot numbers follows from a greater harmonic content in the resulting field curve of the generator and stronger deviations, caused thereby, of the voltage curve from the sinusoidal and/or by higher losses.

Expedient phase numbers in the embodiment, according to the exemplary embodiments and/or exemplary methods of the present invention, of the alternator for motor vehicles are between 3 and 9. Phase numbers that are too low cause an increased ripple in the generated voltage, and thereby increased magnetic noises, for which reason a phase number of 3 as the lower boundary should not be undershot. High phase numbers are suitable for the design of the machine, in principle, but they give rise to increased interconnection expenditure and component expenditure for the rectification of the resulting voltage, in the case of provided use of the generator as an alternator in motor vehicles. Thus, an upper boundary of 9 phases should not be exceeded. In this connection, a five-phase winding may be designed so that, between two adjacent phases, an angular offset of 32° el to 40° el comes about, especially an angular offset of 36° el. A six-phase winding may expediently be built up in such a way that the 6 phases are interconnected to two star connections offset by 28° el to 32° el, which may be by 30° el, the zero points of the stars not being connected. In a seven-phase winding, the phase windings having the same angular offset may be connected in series among one another, in the series connection, in each case, at least one adjacent phase winding being skipped. The stator windings may be constructed of conductor segments.

As a suitable number of holes q in a three-phase design of the machine, values between ½ and less than 3 have come about, which may be values between ¾ and less than 2. In the case of the selection of a phase number between 6 and 9, a number of holes q that is less than 1 is generally expedient. In a particularly advantageous five-phase design of the machine, numbers of holes between ½ and 7/4 are suitable, but even in this case, numbers of holes less than 1 may be preferred. The number of holes should be as low as possible, because otherwise, particularly in the case of higher-phase machines, the resulting slot number clearly increases, along with the production engineering and winding technology difficulties already mentioned. The lower boundary of the suitable number of holes in each case also comes about from the resulting slot number, slot numbers that are too low causing the named disadvantages with respect to the resulting harmonic content in the air gap field.

The fractional-slot winding according to the present invention is expediently executed as a two-layer winding, because this arrangement opens up many possibilities during the insertion of the winding. The stator core stack may be first produced in flat laminated form, because by doing this, on the one hand, the insertion of the winding is able to be simplified, and on the other hand, the fullness factor is clearly able to be increased, by up to 50%, dimensionally speaking. In addition, in one design of the stator, the fractional-slot winding according to the present invention is able to be executed in flat laminated form having fewer overhangs of the coils at the beginning and the end of the flat laminated form, so that the final bending process of the flat laminated form to form a round stator core stack is made clearly easier with respect to the insertion of the winding overhangs into the then adjacent slots, as opposed to an integral-slot winding.

Exemplary embodiments of the present invention are shown in the drawings and explained in greater detail in the following description, as well as in the appended tables showing possible designs of the fractional-slot winding according to the exemplary embodiments and/or exemplary methods of the present invention.

DETAILED DESCRIPTION

Figure 1:
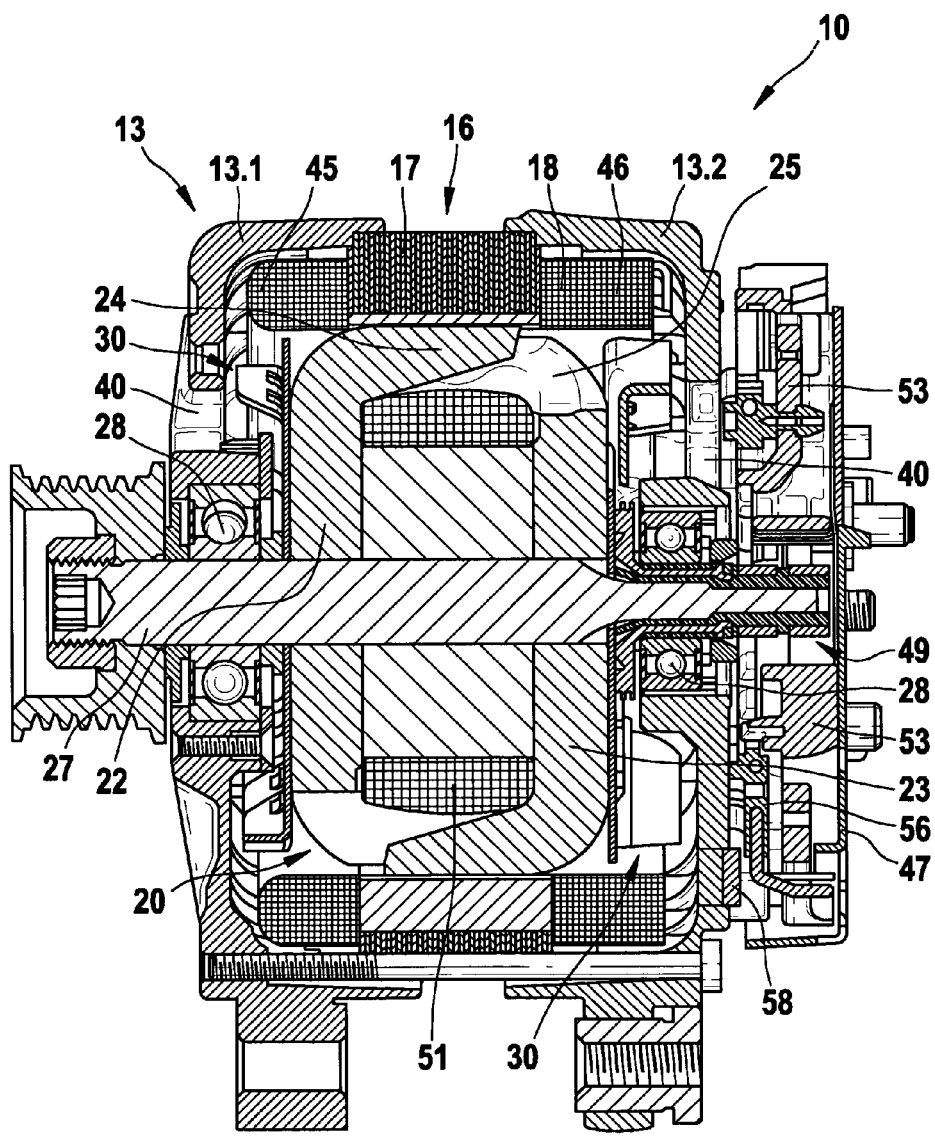
FIG. 1 shows a longitudinal section through an alternator for motor vehicles having a claw-pole rotor.

FIG. 1 shows a section through an alternator 10 for motor vehicles. Among other things, it has a two-part housing 13, which is made up of a first end housing 13.1 and a second end housing 13.2. End housing 13.1 and end housing 13.2 accommodate a stator 16 within themselves, having an annular core stack 17, into whose slots, that are open towards the inside and extend axially, a stator winding 18 has been inserted. With its surface, annular stator 16 surrounds an electromagnetically excited rotor 20, which is developed as a claw-pole rotor. Rotor 20 is made up, among other things, of two claw-pole plates 22 and 23, at whose outer circumference there are situated claw-pole fingers 24 and 25 which extend in each case in the axial direction. The two claw-pole plates 22 and 23 are situated in rotor 20 in such a way that their claw-pole fingers 24, 25, which extend in the axial direction, alternate with each other as N and S poles at the circumference of rotor 20. This brings about magnetically required claw-pole interstices between claw-pole fingers 24 and 25 that are magnetized in the opposite direction. Claw-pole fingers 24 and 25 are slightly beveled at the outer edges for the purpose of noise reduction, these bevels being able to be reduced in cooperation with a stator 16 having a fractional-slot winding as opposed to a stator having an integral-hole winding, since the use of fractional-slot windings makes possible the improvement of the sinusoidal shape of the field curve, whereby the noise development is already reduced.

Rotor 20 is rotatably supported in the respective end shields 13.1 and 13.2, using a shaft 27 and a roller bearing 28 located on each rotor side. It has two axial end faces to which a fan 30 is fastened in each case. These fans 30 are essentially made up of a plate-shaped or disk-shaped section, from which fan blades proceed in a known manner. These fans 30 are used to enable an air exchange between the outside and the inner space of electrical machine 10, via openings 40 in end shields 13.1 and 13.2. For this purpose, openings 40 are provided at the axial ends of end shields 13.1 and 13.2, via which cooling air is sucked into the inner space of electrical machine 10 using fans 30. This cooling air is accelerated outwards by the rotation of fans 30, so that it is able to pass through the cooling air-permeable winding heads 45 on the drive side and 46 on the electronics side. This effect cools the winding heads. After passing through the winding heads, or rather after circumflowing these winding heads, the cooling air proceeds on a radially outward path through openings that are not shown.

In FIG. 1 on the right-hand side there is a protective cap 47 which protects various component parts from environmental influences. Thus, protective cap 47 covers, for instance, a slip-ring component 49 which supplies an excitation winding 51 with field current. Around this slip-ring component group 49 a cooling body 53 is situated, which acts in this case as a positive (plus) cooling body. End shield 13.2 acts as a so-called minus cooling body. Between end shield 13.2 and cooling body 53 a connecting plate 56 is situated, which connects negative diodes 58, that are fastened in end shield 13.2 and plus diodes in cooling body 53, that are not shown in this illustration, to one another in the form of a bridge circuit.

Figure 2:
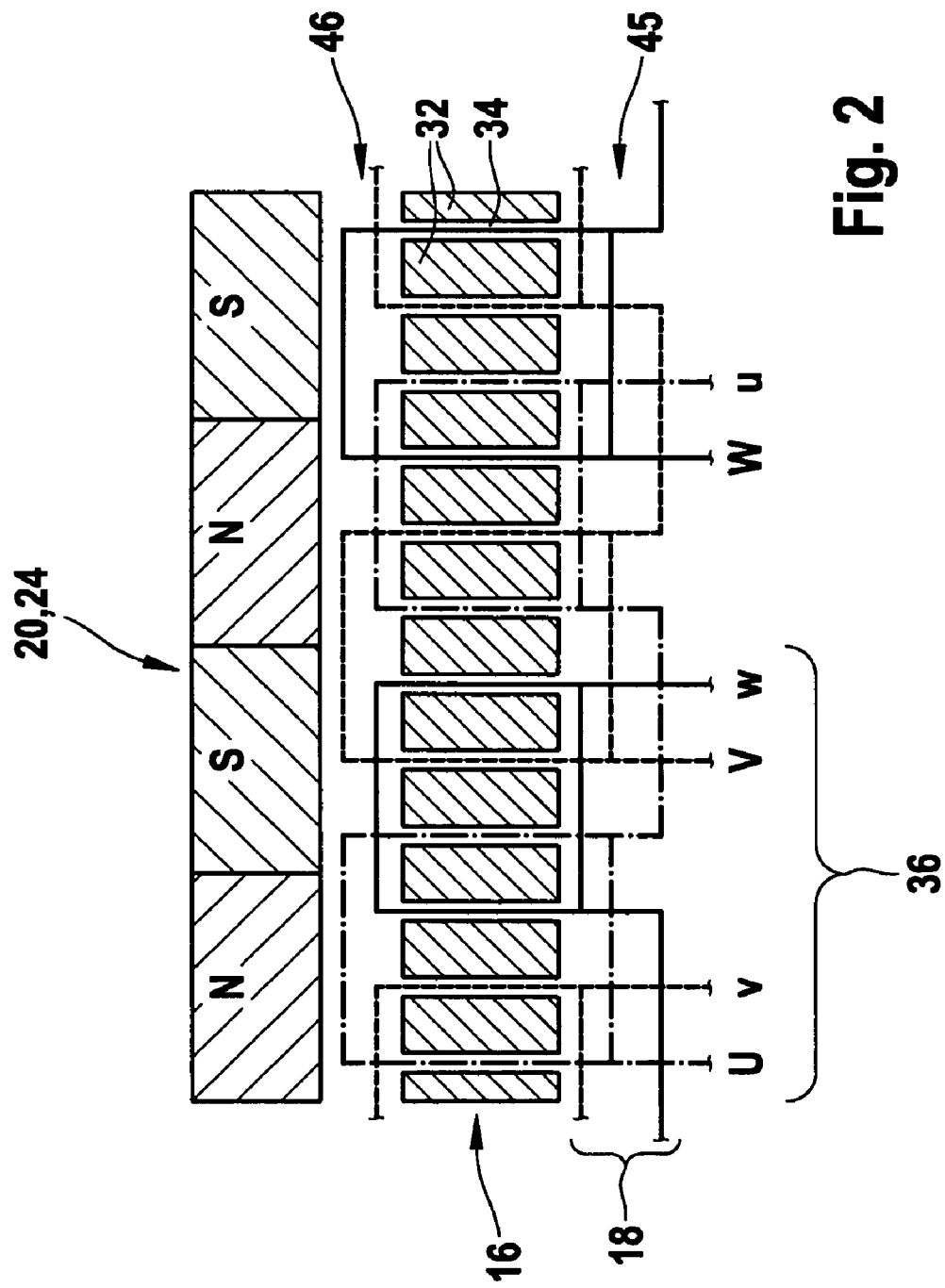
FIG. 2 shows a representation of a usual three-phase integral-hole winding having a number of holes q=1.
Figure 3:
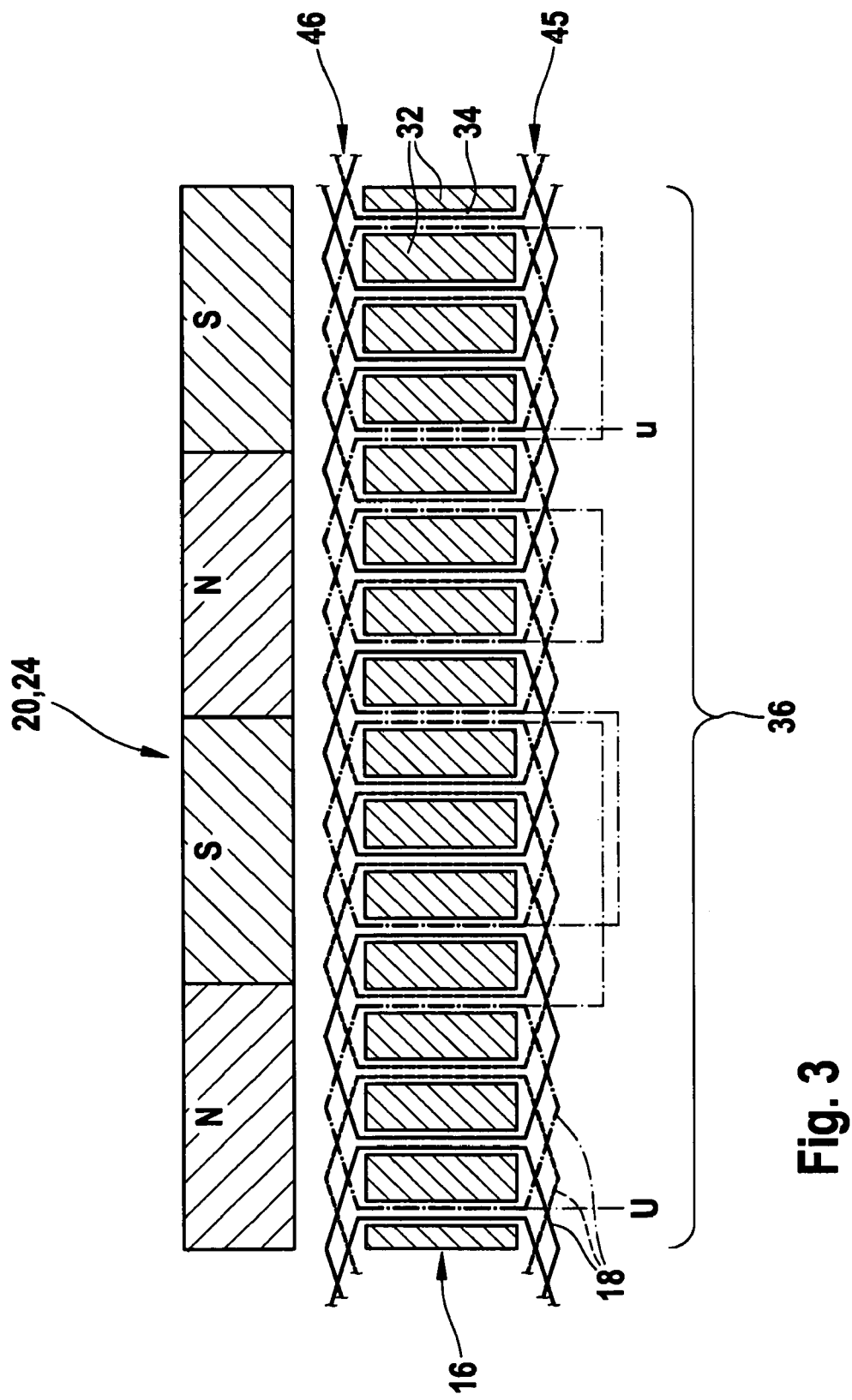
FIG. 3 shows an exemplary embodiment of the fractional-slot winding for a three-phase machine having 4 poles and 15 slots in the embodiment as a two-layer winding, the interconnection being drawn in only for phase U.

FIG. 2 shows the plan of an integral-hole winding 18 using the example of a three-phase machine having a number of holes of q=1. The basic winding of the machine is designated as 36. This is the particular segment of a multipole winding according to which the winding may be periodically continued. In symmetrical windings, basic winding 36 extends over one or more pole pitches of the machine, in the present case over two pole pitches. At most, basic winding 36 includes the entire range of the machine, as is shown in FIG. 3 using the example of a four-pole machine having a fractional-slot winding and is explained there in greater detail. In the case of an integral-hole winding according to FIG. 2, the winding is always able to be continued periodically after one pole pair. The basic winding extends over one pole pair. Besides that, such windings are constructed symmetrically among the two poles, and in the case of a plug-in laminate winding, are designed in such a way that the winding connections in the area of the winding head 45 are located on the drive side of the machine, whereas in the area of opposite winding head 46 the conductors are formed in one piece and bent over into U-shapes.

As an exemplary embodiment of a fractional-slot winding, FIG. 3 shows a three-phase winding constructed as a two-layer winding having two coil sides in each slot 34, the interconnection being drawn in only for phase U, for reasons of clarity. The winding is shown for a machine having 4 poles, 3 phases and 15 slots. In the same way, it may be periodically continued for all machine construction forms having pole numbers corresponding to an integral multiple of four, that is, in the range of the specific embodiments of this Application, for machines having pole numbers of 2p=12, 2p=16 and 2p=20. The fractional-slot winding shown here in exemplary fashion, having a hole number of p=5/4, thus cannot be executed for pole numbers of 2p=10; 14 and 18. Executable combinations of slot numbers and pole numbers may be seen in the subsequent tables. In these tables, the more boldly written hole numbers give the windings that one is able to execute, which yield a symmetrical multiphase system together with the phase number m given at the top of the table.

Whereas in the case of integral-hole windings the basic winding includes a pole pair, and the winding continues periodically among all poles, in the case of fractional-slot windings there exists no symmetrical construction among adjacent poles. The basic winding then mostly extends over several pole pairs, and only in the case of fractional-slot windings having a number of holes q, which has the number 2 in the denominator, does the basic winding extend over one pole pair. Thus, this applies for numbers of holes of q=½, 3/2, 5/2, etc. These windings, however, have no symmetrical construction and no symmetrical pattern of current application among the two adjacent poles.

The fractional-slot winding according to the present invention, according to the exemplary embodiment in FIG. 3, and according to the formula $$q = \frac{N}{2p \cdot m},$$

has a number of holes of q=5/4=1.25, in the case of 15 slots, 4 poles and 3 phases. Thus basic winding 36 extends, not over one pole pair, but over two pole pairs, and includes all 15 slots. The many possibilities for the interconnection of the individual coils and for the development of the winding heads cannot be shown exhaustively in the form of drawings, but they are current knowledge to one skilled in the art, and may be designed without additional inventive step, in a manner corresponding to the overall design of the machine. In this instance, the coil pitch and the connection of the individual coil section may particularly be selected differently from the way that is shown in the exemplary embodiment according to FIG. 3.

The two-layer winding according to FIG. 3 is developed as a lap winding. However, wave windings are also frequently possible which have advantages from a production engineering point of view, because they may be wound more simply using a continuous wire. Lap windings, on the other hand, have shorter connections in winding head 45, however, the multiplicity of design of the winding head can also not be shown here, and is left to one skilled in the art.

Figure 4:
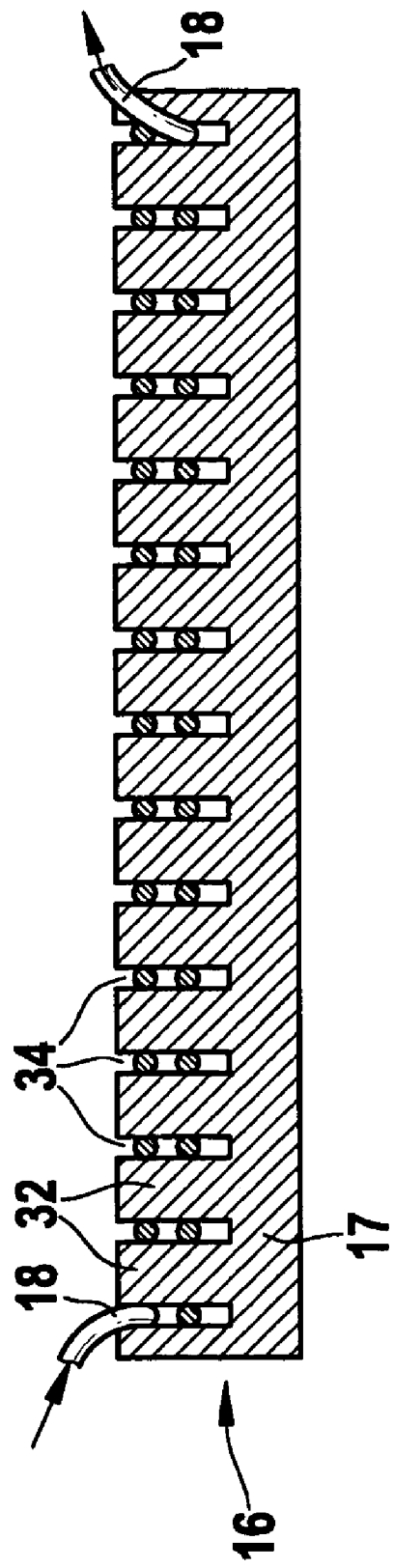
FIG. 4 shows a cutout from the core stack of the stator in the form of a flat laminated form.

FIG. 4 shows a core stack 17 of stator 16 that is expediently designed from the point of view of production engineering, in flat laminated form. In this instance, the individual metal sheets of core stack 17 are punched out from straight, flat strip, then put into layers, and the coils are inserted into slots 34. Only after that, is core stack 17 formed into the annular-shaped stator together with ready stator winding 18, the overhanging coil parts at the ends of core stack 17 being pressed into the allocated slots 34 after the forming. In the execution of stator winding 18 as a fractional-slot winding, this method offers special advantages since, because of the fractional-slot winding, the execution and positioning of winding 18 is able to be designed in such a way that the number of overhangs of the winding is reduced at the ends of the flat laminated form.

In the attached tables, one may see combinations of slot numbers and pole numbers for machines having three, five, six, seven and nine phases, the combinations that do not lead to a symmetrical design of the machine being underlined, while the combinations that are implementable are not underlined in print. Corresponding to the phase number, the various tables each include the possible slot numbers between 15 and 150 and are subdivided according to pole pair numbers 2p=10, 2p=12, 2p=14, 2p=16, 2p=18 and 2p=20. Particularly preferred combinations of slot numbers and appertaining hole numbers of the fractional-slot windings are given in a separate table for the pole numbers 2p=12 and 2p=16.

Besides the parameters discussed before, the natural phase number is also important, in this instance, for the ability to execute fractional-slot windings. The rule that applies in this case is that slot number N has to be dividable integrally by natural phase number $m_N$, otherwise a symmetrical winding cannot be implemented using the respective slot number. The natural phase number $m_N$ is yielded by the phase shift $$\frac{p \cdot 360°}{N}$$

of two adjacent slots. Since only voltages having this electrical slot angle, or an integral multiple thereof, are able to be generated, the natural phase number $$m_N = \frac{N}{GCD(N, 2p)}$$

is the result of the quotient of the respective slot number N and the greatest common divisor (GOD in the above equation) of the slot number and pole number 2p.

The natural phase number $m_N$ tells which phase numbers are able to be implemented in a machine. This is the phase number which is a divisor of the natural phase number. From this there follows, for a symmetrical system, that the natural phase number $m_N$ has to be equal to a multiple of the implementable phase number m.

Thus, in summary, one may say that the disadvantage, coming about especially in higher-phase machines, of greatly restricted design options of the generators by the use of fractional-slot windings, is able to be greatly reduced. This applies especially when using fractional-slot windings having hole numbers less than 1, in which a large number of additional possibilities of implementable slot numbers comes about. The slot number and the phase number may then be selected in such a way that the production of the machine by favorable punching forms makes simple winding technology and high slot fullness substantially easier, and the electrical properties are clearly improved. In particular, torque fluctuations and noises caused by ripple, as well as disadvantages with respect to the resulting voltage form and losses may therefore be considerably reduced in generators for motor vehicles having an electromagnetically excited claw-pole rotor having a multiphase stator winding.

There are no restrictions with respect to the special specific embodiment of the rotor. Thus, additional measures may be undertaken, for example, for compensating for the stray flux between the claw-poles, for instance, by positioning permanent magnets into the interstices between the claw-poles. Such a design of the machine rotor is described in detail in DE 199 51 115 A1, and it may also be used for a generator according to the present invention. These additional permanent magnets act especially advantageously in the case of stator designs having a low number of poles and correspondingly wider poles, which increase the magnetic short circuit, so that the compensation of the stray flux of the permanent magnets is particularly favorable in this instance.

With regard to the reduction in the noise that occurs during use of the alternator, still further design measures may be undertaken, such as encapsulating rotor 20 by nonmagnetic coverings, particularly in the areas of the claw-pole interstices.

Combinations of Slot Numbers and Pole Numbers

| Machines having three phases (m = 3) | | | | | | | | | | | | |
|---|---|---|---|---|---|---|---|---|---|---|---|---|
| | 2p = 10 | | 2p = 12 | | 2p = 14 | | 2p = 16 | | 2p = 18 | | 2p = 20 | |
| N | q | $m_N$ | q | $m_N$ | q | $m_N$ | q | $m_N$ | q | $m_N$ | q | $m_N$ |
| 15 | 1/2 | 3 | | | | | | | | | | |
| 18 | 3/5 | 9 | 1/2 | 3 | | | | | | | | |
| 21 | 7/10 | 21 | 7/12 | 7 | 1/2 | 3 | | | | | | |
| 24 | 4/5 | 12 | 2/3 | 2 | 4/7 | 12 | 1/2 | 3 | | | | |
| 27 | 9/10 | 27 | 3/4 | 9 | 9/14 | 27 | 9/16 | 27 | 1/2 | 3 | | |
| 30 | 1 | 3 | 5/6 | 5 | 5/7 | 15 | 5/8 | 15 | 5/9 | 5 | 1/2 | 3 |
| 33 | 11/10 | 33 | 11/12 | 11 | 11/14 | 33 | 11/16 | 33 | 11/18 | 11 | 11/20 | 33 |
| 36 | 6/5 | 18 | 1 | 3 | 6/7 | 18 | 3/4 | 9 | 2/3 | 2 | 3/5 | 9 |
| 39 | 13/10 | 39 | 13/12 | 13 | 13/14 | 39 | 13/16 | 39 | 13/18 | 13 | 13/20 | 39 |
| 42 | 7/5 | 21 | 7/6 | 7 | 1 | 3 | 7/8 | 21 | 7/9 | 7 | 7/10 | 21 |
| 45 | 3/2 | 9 | 5/4 | 15 | 15/14 | 45 | 15/16 | 45 | 5/6 | 5 | 3/4 | 9 |
| 48 | 8/5 | 24 | 4/3 | 4 | 8/7 | 24 | 1 | 3 | 8/9 | 8 | 4/5 | 12 |
| 51 | 17/10 | 51 | 17/12 | 17 | 17/14 | 51 | 17/16 | 51 | 17/18 | 17 | 17/20 | 51 |
| 54 | 9/5 | 27 | 3/2 | 9 | 9/7 | 27 | 9/8 | 27 | 1 | 3 | 9/10 | 27 |
| 57 | 19/10 | 57 | 19/12 | 19 | 19/14 | 57 | 19/16 | 57 | 19/18 | 19 | 19/20 | 57 |
| 60 | 2 | 6 | 5/3 | 5 | 10/7 | 30 | 5/4 | 15 | 10/9 | 10 | 1 | 3 |
| 63 | 21/10 | 63 | 7/4 | 21 | 3/2 | 9 | 21/16 | 63 | 7/6 | 7 | 21/21 | 63 |
| 66 | 11/5 | 33 | 11/6 | 11 | 11/7 | 33 | 11/8 | 33 | 11/9 | 11 | 11/10 | 33 |
| 69 | 23/10 | 69 | 23/12 | 23 | 23/14 | 69 | 23/16 | 69 | 23/18 | 23 | 23/20 | 69 |
| 72 | 12/5 | 36 | 2 | 6 | 12/7 | 36 | 3/2 | 9 | 4/3 | 4 | 6/5 | 18 |
| 75 | 5/2 | 15 | 25/12 | 25 | 25/14 | 75 | 25/16 | 75 | 25/18 | 25 | 5/4 | 15 |
| 78 | 13/5 | 38 | 13/6 | 13 | 13/7 | 39 | 13/8 | 39 | 13/9 | 13 | 13/10 | 39 |
| 81 | 27/10 | 81 | 9/4 | 27 | 27/14 | 81 | 27/16 | 81 | 3/2 | 9 | 27/20 | 81 |
| 84 | 14/5 | 42 | 7/3 | 7 | 2 | 6 | 7/4 | 21 | 14/9 | 14 | 7/5 | 21 |
| 87 | 29/10 | 87 | 29/12 | 29 | 29/14 | 87 | 29/16 | 87 | 29/18 | 29 | 29/20 | 87 |
| 90 | 3 | 9 | 5/2 | 15 | 15/7 | 45 | 15/8 | 45 | 5/3 | 5 | 3/2 | 9 |
| 93 | | | 31/12 | 31 | 31/14 | 93 | 31/16 | 93 | 31/18 | 31 | 31/20 | 93 |
| 96 | | | 8/3 | 8 | 16/7 | 48 | 2 | 6 | 16/9 | 16 | 8/5 | 24 |
| 99 | | | 11/4 | 33 | 33/14 | 99 | 33/16 | 99 | 11/6 | 11 | 33/20 | 99 |
| 102 | | | 17/6 | 17 | 17/7 | 51 | 17/8 | 51 | 17/9 | 17 | 17/10 | 51 |
| 105 | | | 25/12 | 35 | 5/2 | 15 | 35/16 | 105 | 35/18 | 35 | 7/4 | 21 |
| 108 | | | 3 | 9 | 18/7 | 54 | 9/4 | 27 | 2 | 6 | 9/5 | 27 |
| 111 | | | | | 37/14 | 111 | 37/16 | 111 | 37/18 | 37 | 37/20 | 111 |
| 114 | | | | | 19/7 | 57 | 19/8 | 57 | 19/9 | 19 | 19/10 | 57 |
| 117 | | | | | 39/14 | 117 | 39/16 | 117 | 13/6 | 13 | 39/20 | 117 |
| 120 | | | | | 20/7 | 60 | 5/2 | 15 | 29/9 | 20 | 2 | 6 |
| 123 | | | | | 41/14 | 123 | 41/16 | 123 | 41/18 | 41 | 41/20 | 123 |
| 126 | | | | | 3 | 9 | 21/8 | 63 | 7/3 | 7 | 21/10 | 63 |
| 129 | | | | | | | 43/16 | 129 | 43/18 | 43 | 43/20 | 129 |
| 132 | | | | | | | 22/8 | 33 | 22/9 | 22 | 11/5 | 33 |
| 135 | | | | | | | 45/16 | 135 | 5/2 | 15 | 9/4 | 27 |
| 138 | | | | | | | 23/8 | 69 | 23/9 | 23 | 23/10 | 69 |
| 141 | | | | | | | 47/18 | 141 | 47/18 | 47 | 47/20 | 141 |
| 144 | | | | | | | 3 | 9 | 8/3 | 8 | 12/5 | 36 |
| 147 | | | | | | | | | 49/18 | 49 | 49/20 | 147 |
| 150 | | | | | | | | | 25/9 | 25 | 5/2 | 15 |

| Machines having five phases (m = 5) | | | | | | | | | | | | |
|---|---|---|---|---|---|---|---|---|---|---|---|---|
| | 2p = 10 | | 2p = 12 | | 2p = 14 | | 2p = 16 | | 2p = 18 | | 2p = 20 | |
| N | q | mN | q | mN | q | mN | q | mN | q | mN | q | mN |
| 15 | 3/10 | 3 | 1/4 | 5 | 3/14 | 15 | | | | | | |
| 20 | 2/5 | 2 | 1/3 | 5 | 2/7 | 10 | 1/4 | 5 | 2/9 | 10 | | |
| 25 | 1/2 | 5 | 5/12 | 25 | 5/14 | 25 | 5/16 | 25 | 5/18 | 25 | 1/4 | 5 |
| 30 | 3/5 | 3 | 1/2 | 5 | 3/7 | 15 | 3/8 | 15 | 1/3 | 5 | 3/10 | 3 |
| 35 | 7/10 | 7 | 7/12 | 35 | 1/2 | 5 | 7/16 | 35 | 7/18 | 35 | 7/20 | 7 |
| 40 | 4/5 | 4 | 2/3 | 10 | 4/7 | 20 | 1/2 | 5 | 4/9 | 20 | 4/10 | 2 |
| 45 | 9/10 | 9 | 3/4 | 15 | 9/14 | 45 | 9/16 | 45 | 1/2 | 5 | 9/20 | 9 |
| 50 | 1 | 5 | 5/6 | 25 | 5/7 | 25 | 5/8 | 25 | 5/9 | 25 | 1/2 | 5 |
| 55 | 11/10 | 11 | 11/12 | 55 | 11/14 | 55 | 11/16 | 55 | 11/18 | 55 | 11/20 | 11 |
| 60 | 6/5 | 6 | 1 | 5 | 6/7 | 30 | 3/4 | 15 | 2/3 | 10 | 6/10 | 3 |
| 65 | 13/10 | 13 | 13/12 | 65 | 13/14 | 65 | 13/16 | 65 | 13/18 | 65 | 13/20 | 13 |
| 70 | 7/5 | 7 | 7/6 | 35 | 1 | 5 | 7/8 | 35 | 7/9 | 35 | 7/10 | 7 |
| 75 | 3/2 | 15 | 5/4 | 25 | 15/14 | 75 | 15/16 | 75 | 5/6 | 25 | 3/4 | 15 |

-continued

Machines having five phases (m = 5)

| N | 2p = 10 | | 2p = 12 | | 2p = 14 | | 2p = 16 | | 2p = 18 | | 2p = 20 | |
|---|---|---|---|---|---|---|---|---|---|---|---|---|
| | q | mN | q | mN | q | mN | q | mN | q | mN | q | mN |
| 80  | 8/5   | 8  | 4/3   | 20 | 8/7   | 40  | 1     | 5   | 8/9   | 40  | 8/10  | 4  |
| 85  | 17/10 | 17 | 17/12 | 85 | 17/14 | 85  | 17/16 | 85  | 17/18 | 85  | 17/20 | 17 |
| 90  | 9/5   | 9  | 3/2   | 15 | 9/7   | 45  | 9/8   | 45  | 1     | 5   | 9/10  | 9  |
| 95  | 19/10 | 19 | 19/12 | 95 | 19/14 | 95  | 19/16 | 95  | 19/18 | 95  | 19/20 | 19 |
| 100 | 2     | 10 | 5/3   | 25 | 10/7  | 50  | 5/4   | 25  | 10/9  | 50  | 1     | 5  |
| 105 |       |    | 7/4   | 35 | 3/2   | 15  | 21/16 | 105 | 7/6   | 35  | 21/20 | 21 |
| 110 |       |    | 11/6  | 55 | 11/7  | 55  | 11/8  | 55  | 11/9  | 55  | 11/10 | 11 |
| 115 |       |    | 23/12 | 115| 23/14 | 115 | 23/16 | 115 | 23/18 | 115 | 23/20 | 23 |
| 120 |       |    | 2     | 10 | 12/7  | 60  | 3/2   | 15  | 4/3   | 20  | 12/10 | 6  |
| 125 |       |    |       |    | 25/14 | 125 | 25/16 | 125 | 25/18 | 125 | 5/4   | 25 |
| 130 |       |    |       |    | 13/7  | 65  | 13/8  | 65  | 13/9  | 65  | 13/10 | 13 |
| 135 |       |    |       |    | 27/14 | 135 | 27/16 | 135 | 3/2   | 15  | 27/20 | 27 |
| 140 |       |    |       |    | 2     | 10  | 7/4   | 35  | 14/9  | 70  | 14/10 | 7  |
| 145 |       |    |       |    |       |     | 29/16 | 145 | 29/18 | 145 | 29/20 | 29 |
| 150 |       |    |       |    |       |     | 15/8  | 75  | 5/3   | 25  | 3/2   | 15 |

Machines having six phases (m = 6)

| N | 2p = 10 | | 2p = 12 | | 2p = 14 | | 2p = 16 | | 2p = 18 | | 2p = 20 | |
|---|---|---|---|---|---|---|---|---|---|---|---|---|
| | q | $m_N$ | q | $m_N$ | q | $m_N$ | q | $m_N$ | q | $m_N$ | q | $m_N$ |
| 18  | 3/10  | 9  | 1/4   | 3  | 3/14  | 9  |       |    |       |    |       |    |
| 24  | 2/5   | 12 | 1/3   | 2  | 2/7   | 12 | 1/4   | 3  | 2/9   | 4  |       |    |
| 30  | 1/2   | 3  | 5/12  | 5  | 5/14  | 15 | 5/16  | 15 | 5/18  | 5  | 1/4   | 3  |
| 36  | 3/5   | 18 | 1/2   | 3  | 3/7   | 18 | 1/8   | 9  | 1/3   | 2  | 3/10  | 9  |
| 42  | 7/10  | 21 | 7/12  | 7  | 1/2   | 3  | 7/16  | 21 | 7/18  | 7  | 7/20  | 21 |
| 48  | 4/5   | 24 | 2/3   | 4  | 4/7   | 24 | 1/2   | 3  | 4/9   | 8  | 2/5   | 12 |
| 54  | 9/10  | 27 | 3/4   | 9  | 9/14  | 27 | 9/16  | 27 | 1/2   | 3  | 9/20  | 27 |
| 60  | 1     | 6  | 5/6   | 5  | 5/7   | 30 | 5/8   | 15 | 5/9   | 10 | 1/2   | 3  |
| 66  | 11/10 | 33 | 11/12 | 11 | 11/14 | 33 | 11/16 | 33 | 11/18 | 11 | 11/20 | 33 |
| 72  | 6/5   | 36 | 1     | 6  | 6/7   | 36 | 3/4   | 9  | 2/3   | 4  | 3/5   | 18 |
| 78  | 13/10 | 39 | 13/12 | 13 | 13/14 | 39 | 13/16 | 39 | 13/18 | 13 | 13/20 | 39 |
| 84  | 7/5   | 42 | 7/6   | 7  | 1     | 6  | 7/8   | 21 | 7/9   | 14 | 7/10  | 21 |
| 90  | 3/2   | 9  | 5/4   | 15 | 15/14 | 45 | 15/16 | 45 | 5/6   | 5  | 3/4   | 9  |
| 96  |       |    | 4/3   | 8  | 8/7   | 48 | 1     | 6  | 8/9   | 16 | 4/5   | 24 |
| 102 |       |    | 17/12 | 17 | 17/14 | 51 | 17/16 | 51 | 17/18 | 17 | 17/20 | 51 |
| 108 |       |    | 3/2   | 9  | 9/7   | 54 | 9/8   | 27 | 1     | 6  | 9/10  | 27 |
| 114 |       |    |       |    | 19/14 | 57 | 19/16 | 57 | 19/18 | 19 | 19/20 | 57 |
| 120 |       |    |       |    | 10/7  | 60 | 5/4   | 15 | 10/9  | 20 | 1     | 6  |
| 126 |       |    |       |    | 3/2   | 9  | 21/16 | 63 | 7/6   | 7  | 21/20 | 63 |
| 132 |       |    |       |    |       |    | 11/8  | 33 | 11/9  | 22 | 11/10 | 33 |
| 138 |       |    |       |    |       |    | 23/16 | 69 | 23/18 | 23 | 23/20 | 69 |
| 144 |       |    |       |    |       |    | 3/2   | 9  | 4/3   | 8  | 6/5   | 36 |
| 150 |       |    |       |    |       |    |       |    | 25/18 | 25 | 5/4   | 15 |

Machines having seven phases (m = 7)

| N | 2p = 10 | | 2p = 12 | | 2p = 14 | | 2p = 16 | | 2p = 18 | | 2p = 20 | |
|---|---|---|---|---|---|---|---|---|---|---|---|---|
| | q | $m_N$ | q | $m_N$ | q | $m_N$ | q | $m_N$ | q | $m_N$ | q | $m_N$ |
| 21 | 3/10  | 21 | 1/4   | 7  | 3/14  | 3  |       |    |       |    |       |    |
| 28 | 2/5   | 14 | 1/3   | 7  | 2/7   | 2  | 1/4   | 7  | 2/9   | 14 |       |    |
| 35 | 1/2   | 7  | 5/12  | 35 | 5/14  | 5  | 5/16  | 35 | 5/18  | 35 | 1/4   | 7  |
| 42 | 3/5   | 21 | 1/2   | 7  | 3/7   | 3  | 3/8   | 21 | 1/3   | 7  | 3/10  | 21 |
| 49 | 7/10  | 49 | 7/12  | 49 | 1/2   | 7  | 7/16  | 49 | 7/18  | 49 | 7/20  | 49 |
| 56 | 4/5   | 28 | 2/3   | 14 | 4/7   | 4  | 1/2   | 7  | 4/9   | 28 | 2/5   | 14 |
| 63 | 9/10  | 63 | 3/4   | 21 | 9/14  | 9  | 9/16  | 63 | 1/2   | 7  | 9/20  | 63 |
| 70 | 1     | 7  | 5/6   | 35 | 5/7   | 5  | 5/8   | 35 | 5/9   | 35 | 1/2   | 7  |
| 77 | 11/10 | 77 | 11/12 | 77 | 11/14 | 11 | 11/16 | 77 | 11/18 | 77 | 11/20 | 77 |

Machines having seven phases (m = 7)

| N | 2p = 10 q | 2p = 10 $m_N$ | 2p = 12 q | 2p = 12 $m_N$ | 2p = 14 q | 2p = 14 $m_N$ | 2p = 16 q | 2p = 16 $m_N$ | 2p = 18 q | 2p = 18 $m_N$ | 2p = 20 q | 2p = 20 $m_N$ |
|---|---|---|---|---|---|---|---|---|---|---|---|---|
| 84 | 6/5 | 42 | 1 | 7 | 6/7 | 6 | 3/4 | 21 | 2/3 | 14 | 3/5 | 21 |
| 91 | 13/10 | 91 | 13/12 | 91 | 13/14 | 13 | 13/16 | 91 | 13/18 | 91 | 13/20 | 91 |
| 98 | 7/5 | 49 | 7/6 | 49 | 1 | 7 | 7/8 | 49 | 7/9 | 49 | 7/10 | 49 |
| 105 | 3/2 | 21 | 5/4 | 35 | 15/14 | 15 | 15/16 | 105 | 5/6 | 35 | 3/4 | 21 |
| 112 | | | 4/3 | 28 | 8/7 | 8 | 1 | 7 | 8/9 | 56 | 4/5 | 28 |
| 119 | | | 17/12 | 119 | 17/14 | 17 | 17/16 | 119 | 17/18 | 119 | 17/20 | 119 |
| 126 | | | 3/2 | 21 | 9/7 | 9 | 9/8 | 63 | 1 | 7 | 9/10 | 63 |
| 133 | | | | | 19/14 | 19 | 19/16 | 133 | 19/18 | 133 | 19/20 | 133 |
| 140 | | | | | 10/7 | 10 | 5/4 | 35 | 10/9 | 70 | 1 | 7 |
| 147 | | | | | 3/2 | 21 | 21/16 | 147 | 7/6 | 49 | 21/20 | 147 |

Machines having nine phases (m = 9)

| N | 2p = 10 q | 2p = 10 $m_N$ | 2p = 12 q | 2p = 12 $m_N$ | 2p = 14 q | 2p = 14 $m_N$ | 2p = 16 q | 2p = 16 $m_N$ | 2p = 18 q | 2p = 18 $m_N$ | 2p = 20 q | 2p = 20 $m_N$ |
|---|---|---|---|---|---|---|---|---|---|---|---|---|
| 18 | 1/5 | 9 | | | | | | | | | | |
| 27 | 3/10 | 27 | 1/4 | 9 | 3/14 | 27 | | | | | | |
| 36 | 2/5 | 18 | 1/3 | 3 | 2/7 | 18 | 1/4 | 9 | 2/9 | 2 | | |
| 45 | 1/2 | 9 | 5/12 | 15 | 5/14 | 45 | 5/16 | 45 | 5/18 | 5 | 1/4 | 9 |
| 54 | 3/5 | 27 | 1/2 | 9 | 3/7 | 27 | 3/8 | 27 | 1/3 | 3 | 3/10 | 27 |
| 63 | 7/10 | 63 | 7/12 | 21 | 1/2 | 9 | 7/16 | 63 | 7/18 | 7 | 7/20 | 63 |
| 72 | 4/5 | 36 | 2/3 | 6 | 4/7 | 36 | 1/2 | 9 | 4/9 | 4 | 2/5 | 18 |
| 81 | 9/10 | 81 | 3/4 | 27 | 9/14 | 81 | 9/16 | 81 | 1/2 | 9 | 9/20 | 81 |
| 90 | 1 | 9 | 5/6 | 15 | 5/7 | 45 | 5/8 | 45 | 5/9 | 15 | 1/2 | 9 |
| 99 | | | 11/12 | 33 | 11/14 | 99 | 11/16 | 99 | 11/18 | 11 | 11/20 | 99 |
| 108 | | | 1 | 9 | 6/7 | 54 | 3/4 | 27 | 2/3 | 6 | 3/5 | 27 |
| 117 | | | | | 13/14 | 117 | 13/16 | 117 | 13/18 | 13 | 13/20 | 117 |
| 126 | | | | | 1 | 9 | 7/8 | 63 | 7/9 | 7 | 7/10 | 63 |
| 135 | | | | | | | 15/16 | 135 | 5/6 | 15 | 3/4 | 27 |
| 144 | | | | | | | 1 | 9 | 8/9 | 8 | 4/5 | 36 |

For three-phase machines, the following combinations must be explicitly considered:

| 2p = 12 | N = | 27 | 45 | 54 | 63 | | |
| --- | --- | --- | --- | --- | --- | --- | --- |
| | q = | 3/4 | 5/4 | 3/2 | 7/4 | | |

| 2p = 16 | N = | 36 | 60 | 72 | 84 | 90 | 108 |
| --- | --- | --- | --- | --- | --- | --- | --- |
| | q = | 3/4 | 5/4 | 3/2 | 7/4 | 15/8 | 9/4 |

For five-phase machines, the following combinations must be explicitly considered:

| 2p = 12 | N = | 20 | 30 | 40 | 45 | 50 | 70 | 75 | 80 |
| --- | --- | --- | --- | --- | --- | --- | --- | --- | --- |
| | q = | 1/3 | 1/2 | 2/3 | 3/4 | 5/6 | 7/6 | 5/4 | 4/3 |

| 2p = 16 | N = | 30 | 40 | 50 | 60 | 70 | 90 | 100 | |
| --- | --- | --- | --- | --- | --- | --- | --- | --- | --- |
| | q = | 3/8 | 1/2 | 5/8 | 3/4 | 7/8 | 9/8 | 5/4 | |

For seven-phase machines, the following combinations must be explicitly considered:

| 2p = 12 | N = | 42 | 56 | 63 | 70 | 98 | 105 | 112 |
| --- | --- | --- | --- | --- | --- | --- | --- | --- |
| | q = | 1/2 | 2/3 | 3/4 | 5/6 | 7/6 | 5/4 | 4/3 |

| 2p = 16 | N = | 42 | 56 | 70 | 84 | 98 | 126 | 140 |
| --- | --- | --- | --- | --- | --- | --- | --- | --- |
| | q = | 3/8 | 1/2 | 5/8 | 3/4 | 7/8 | 9/8 | 5/4 |

For nine-phase machines, the following combinations must be explicitly considered:

| 2p = 12 | N = | 27 | 54 | 81 | | | |
| --- | --- | --- | --- | --- | --- | --- | --- |
| | q = | 1/4 | 1/2 | 3/4 | | | |

| 2p = 16 | N = | 36 | 54 | 72 | 90 | 108 | 126 |
| --- | --- | --- | --- | --- | --- | --- | --- |
| | q = | 1/4 | 3/8 | 1/2 | 5/8 | 3/4 | 7/8 |

What is claimed is:

1. An alternator for motor vehicles, comprising:
a rotor having poles which are claw-poles; and
a stator having a multiphase winding, wherein the stator has a slot number, a pole number and a phase winding number, and wherein the multiphase winding is a fractional slot winding defined as having a quotient of the slot number and the product of the pole number and the phase winding number being a fraction.

2. The alternator of claim 1, wherein the stator winding includes from a five-phase to a nine-phase arrangement.

3. The alternator of claim 2, wherein the stator winding is a five-phase arrangement.

4. The alternator of claim 1, wherein the stator winding has a pole number between 10 and 20.

5. The alternator of claim 4, wherein the stator winding has a pole number between 12 and 16.

6. The alternator of claim 1, wherein a slot number of the stator winding is greater than 1.5 times a pole number.

7. The alternator of claim 6, wherein the slot number of the stator winding is greater than twice the pole number.

8. The alternator of claim 1, wherein a slot number of a stator winding amounts to 15 to 150.

9. The alternator of claim 8, wherein the slot number of the stator winding amounts to 40 to 100.

10. The alternator of claim 1, wherein the stator winding is a three-phase arrangement, having a hole number between ½ and less than 3.

11. The alternator of claim 10, wherein the hole number is between ¾ and less than 2.

12. The alternator of claim 1, wherein the stator winding is a five-phase arrangement, having a hole number between ¼ and less than 7/4.

13. The alternator of claim 12, wherein the hole number is less than 1.

14. The alternator of claim 1, wherein the stator winding is a six-phase arrangement having a hole number less than 1.

15. The alternator of claim 1, wherein the stator winding is a seven-phase arrangement, having a hole number between ¼ and 5/4.

16. The alternator of claim 15, wherein the hole number is less than 1.

17. The alternator of claim 1, wherein the stator winding is a nine-phase arrangement having a hole number less than 1.

18. The alternator of claim 1, wherein the stator winding is constructed as a two-layer winding.

19. The alternator of claim 1, wherein the laminated stator core is produced in a flat laminated form.

* * * * *

UNITED STATES PATENT AND TRADEMARK OFFICE
CERTIFICATE OF CORRECTION

PATENT NO. : 8,354,770 B2  Page 1 of 1
APPLICATION NO. : 12/304098
DATED : January 15, 2013
INVENTOR(S) : Wolf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 77 days.

Signed and Sealed this

First Day of September, 2015

Michelle K. Lee
*Director of the United States Patent and Trademark Office*